(12) United States Patent
Xu et al.

(10) Patent No.: US 11,153,931 B2
(45) Date of Patent: Oct. 19, 2021

(54) INTERFERENCE CANCELLATION METHOD AND BASE STATION

(71) Applicant: HUAWEI TECHNOLOGIES CO., LTD., Guangdong (CN)

(72) Inventors: Bin Xu, Beijing (CN); Zhenzhen Cao, Beijing (CN); Bingzhao Li, Beijing (CN); Li Chai, Shenzhen (CN); Wei Quan, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 33 days.

(21) Appl. No.: 16/673,387

(22) Filed: Nov. 4, 2019

(65) Prior Publication Data
US 2020/0068651 A1  Feb. 27, 2020

Related U.S. Application Data

(63) Continuation of application No. PCT/CN2018/085321, filed on May 2, 2018.

(30) Foreign Application Priority Data

May 5, 2017 (CN) .......................... 201710314138.2

(51) Int. Cl.
*H04W 80/02* (2009.01)
*H04W 28/02* (2009.01)
*H04W 80/08* (2009.01)

(52) U.S. Cl.
CPC ....... *H04W 80/02* (2013.01); *H04W 28/0278* (2013.01); *H04W 80/08* (2013.01)

(58) Field of Classification Search
CPC .... H04L 5/00; H04W 28/02; H04W 28/0278; H04W 72/12; H04W 80/02; H04W 80/08
See application file for complete search history.

(56) References Cited

U.S. PATENT DOCUMENTS

| 2011/0170495 A1* | 7/2011 | Earnshaw | H04L 5/001 370/329 |
| 2013/0286993 A1* | 10/2013 | Lee | H04W 72/0406 370/329 |
| 2014/0348118 A1* | 11/2014 | Zhang | H04W 28/0278 370/329 |

(Continued)

FOREIGN PATENT DOCUMENTS

| CN | 101754393 A | 6/2010 |
| CN | 102148670 A | 8/2011 |

(Continued)

*Primary Examiner* — Kashif Siddiqui
(74) *Attorney, Agent, or Firm* — Womble Bond Dickinson (US) LLP

(57) ABSTRACT

This application describes a data transmission method, a terminal device, and a network device. The method may include determining, by a medium access control (MAC) layer of a terminal device, a first MAC control element and a second MAC control element. The method may also include simultaneously transmitting, by the terminal device, the first MAC control element and the second MAC control element on different uplink transmission resources. The data transmission method, the terminal device, and the network device in embodiments of this application help to improve data transmission reliability.

20 Claims, 8 Drawing Sheets

300

A medium access control MAC layer of a terminal device determines a first MAC control element and a second MAC control element — S310

The terminal device simultaneously transmits the first MAC control element and the second MAC control element on different uplink transmission resources — S320

(56) References Cited

U.S. PATENT DOCUMENTS

| | | | | |
|---|---|---|---|---|
| 2015/0327187 A1* | 11/2015 | Lu | ................ | H04W 52/365 |
| | | | | 370/329 |
| 2015/0341870 A1* | 11/2015 | Kim | ................ | H04W 72/0413 |
| | | | | 370/329 |
| 2016/0352493 A1* | 12/2016 | Tan Bergstrom | ..... | H04L 5/0098 |
| 2017/0013638 A1* | 1/2017 | Takahashi | ......... | H04W 72/1242 |
| 2019/0045458 A1* | 2/2019 | Harada | ................ | H04W 72/04 |

FOREIGN PATENT DOCUMENTS

| | | |
|---|---|---|
| CN | 106304411 A | 1/2017 |
| EP | 2804419 A1 | 11/2014 |
| EP | 3122139 A1 | 1/2017 |
| WO | 2016159528 A1 | 10/2016 |

* cited by examiner

500
A network device determines first signaling, where the first signaling carries information that can enable a terminal device to simultaneously transmit a first medium access control MAC control element and a second MAC control element on different uplink transmission resources ⟶ S510
The network device sends the first signaling to the terminal device ⟶ S520
FIG. 5
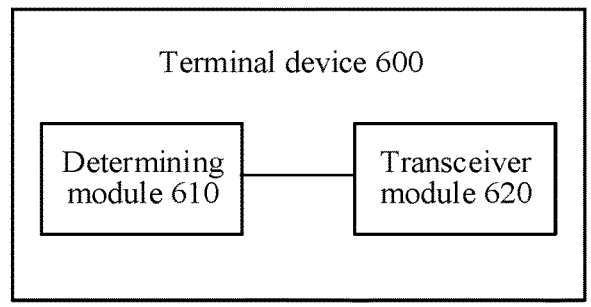
FIG. 6
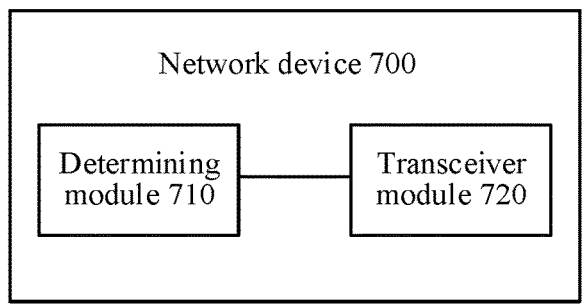
FIG. 7

INTERFERENCE CANCELLATION METHOD AND BASE STATION

CROSS-REFERENCE TO RELATED APPLICATIONS

This application is a continuation of International Application No. PCT/CN2018/085321, filed on May 2, 2018, which claims priority to Chinese Patent Application No. 201710314138.2, filed on May 5, 2017. The disclosures of the aforementioned applications are hereby incorporated by reference in their entireties.

TECHNICAL FIELD

This application relates to the communications field, and more specifically, to a data transmission method, a terminal device, and a network device.

BACKGROUND

In a long term evolution (LTE) system, radio interface protocol stacks may be divided into three protocol layers, from the bottom to the top successively being: a physical layer (L1), a data link layer (L2), and a network layer (L3). From the bottom to the top, the data link layer (L2) is successively: a medium access control (MAC) layer, a radio link control (RLC) layer, and a packet data convergence protocol (PDCP) layer. The PDCP layer processes a radio resource control (RRC) message on a control plane, an internet protocol packet (IP) on a user plane, and the like. On the user plane, after obtaining an IP data packet from an upper layer, a PDCP sublayer may perform header compression and encryption on a PDCP service data unit (SDU) of the IP data packet, and add a PDCP head to a processed data packet, to form a PDCP protocol data unit (PDU), and transfer the PDCP PDU to an RLC sublayer. The PDCP sublayer further provides the upper layer with a sequential submission function and a duplicate packet detection function. Currently, a PDCP layer data resending mechanism is introduced into fifth generation cellular network technology (5G), to be specific, each original data packet generated by PDCP needs to be copied to obtain a same packet, and then the two data packets are respectively transferred by the PDCP layer to two different RLC entities, and transmitted, on different logical channels, to the MAC layer. However, a data transmission method in the prior art has relatively low reliability. In view of this, a new solution needs to be urgently provided.

SUMMARY

This application provides a data transmission method, a terminal device, and a network device, to help to improve data transmission reliability.

According to a first aspect, a data transmission method is provided. The method includes:

determining, by a medium access control MAC layer of a terminal device, a first MAC control element and a second MAC control element; and simultaneously transmitting, by the terminal device, the first MAC control element and the second MAC control element on different uplink transmission resources.

In embodiments of this application, the terminal device transmits the first MAC control element and the second MAC control element on the different uplink transmission resources, to help to improve data transmission reliability.

The simultaneous transmission means that the transmission has a same time domain. Correspondingly, the simultaneous transmission on the different uplink transmission resources may be understood as transmission on the different uplink transmission resources in a frequency division multiplex or time division multiplex manner. Usually, the solution is not applicable to a multiple-input multiple-output (MIMO) transmission scenario.

Optionally, the MAC layer of the terminal device may make a plurality of copies of the first MAC control element, to obtain a plurality of copies of MAC control elements.

For example, the terminal device may copy the first MAC control element, to obtain the second MAC control element. The first MAC control element and the second MAC control element may be respectively understood as an original MAC control element and a duplicate MAC control element.

In some possible embodiments, the transmitting, by the terminal device, the first MAC control element and the second MAC control element on different uplink transmission resources includes:

transmitting, by the terminal device, the first MAC control element on an uplink transmission resource of a first carrier, and transmitting the second MAC control element on an uplink transmission resource of a second carrier, where the first carrier is different from the second carrier.

In some possible embodiments, the transmitting, by the terminal device, the first MAC control element and the second MAC control element on different uplink transmission resources includes:

transmitting, by the terminal device, the first MAC control element and the second MAC control element on different uplink transmission resources of a same carrier.

In some possible embodiments, the determining, by a medium access control MAC layer of a terminal device, a first MAC control element and a second MAC control element includes:

triggering, by the MAC layer of the terminal device, the first MAC control element; and copying, by the MAC layer of the terminal device, the first MAC control element, to obtain the second MAC control element.

In some possible embodiments, the first MAC control element includes a first buffer status report (BSR), the second MAC control element (MAC CE) includes a second BSR, the first BSR is triggered by first data, the second BSR is triggered by second data, and the first data and the second data are duplicate data of each other.

A BSR may be understood as a MAC CE, and the BSR is used by the terminal device to indicate an amount of data that the terminal device needs to send.

"Being duplicate data of each other" means that the first data is duplicate data of the second data and the second data is duplicate data of the first data. For example, if the first data is an original data packet, the second data is a duplicate data packet obtained by copying the original data packet; or if the second data is an original data packet, the first data is a duplicate data packet obtained by copying the original data packet.

Optionally, the first BSR is triggered by a logical channel group in which the first data is located, and the second BSR is triggered by a logical channel group in which the second data is located; or the first BSR is triggered by a logical channel on which the first data is located, and the second BSR is triggered by a logical channel on which the second data is located.

Herein, when configuring logical channels (LCH), the network device respectively configures, into different logical channel groups (LCG), the logical channel on which the first data is located and the logical channel on which the second data is located, in other words, the logical channel on which the first data is located and the logical channel on which the second data is located correspond to the different logical channel groups. In this way, the first BSR may be triggered by the logical channel group corresponding to the logical channel on which the first data is located, and the second BSR may be triggered by the logical channel group corresponding to the logical channel on which the second data is located.

Alternatively, the first BSR may be directly triggered by the logical channel on which the first data is located, and the second BSR may be directly triggered by the logical channel on which the second data is located. To be specific, when triggering BSRs for data packets, the terminal device may respectively trigger the BSRs on the two logical channels (namely, a logical channel on which an original data packet is transmitted and a logical channel on which a duplicate data packet is transmitted).

It should be noted that, for the two logical channels, if one logical channel is a logical channel on which an original PDU is transmitted, and the other logical channel is a logical channel on which a duplicate PDU is transmitted, when data arrives on either logical channel and a BSR needs to be triggered, BSR triggering on this logical channel is not affected by whether data is transmitted on the other logical channel. In other words, the two logical channels may be understood as mutually independent logical channels.

In some possible embodiments, the method further includes:

triggering, by the terminal device, the second BSR when there is to-be-sent data on the logical channel on which the second data is located.

Optionally, when the first BSR is transmitted in a MAC PDU, the terminal device does not cancel the second BSR.

Optionally, the first BSR and the second BSR are transmitted on different uplink transmission resources within a same transmission time interval.

In some possible embodiments, the method further includes:

receiving, by the terminal device, first information sent by a network device, where the first information includes a correspondence that is between a logical channel and a carrier and that is configured by the network device; and the transmitting, by the terminal device, the first MAC control element on an uplink transmission resource of a first carrier, and transmitting the second MAC control element on an uplink transmission resource of a second carrier includes:

transmitting, by the terminal device based on the correspondence, the first BSR on the uplink transmission resource of the first carrier, and transmitting the second BSR on the uplink transmission resource of the second carrier.

Optionally, the first information may be carried in control signaling or high layer signaling, such as RRC signaling.

Optionally, after the terminal device triggers the first BSR and the second BSR, if there is an available uplink transmission resource, the terminal device may directly separately transmit the first BSR and the second BSR on the uplink transmission resource. Alternatively, if there is no available uplink transmission resource, the terminal device needs to request an uplink transmission resource from the network device.

In some possible embodiments, the method further includes:

sending, by the terminal device, a first scheduling request and a second scheduling request to the network device, where the first scheduling request is used to request the uplink transmission resource for the first BSR, and the second scheduling request is used to request the uplink transmission resource for the second BSR.

Herein, the terminal device may request the uplink transmission resources from the network device in an explicit manner or an implicit manner.

For example, in embodiments, the "explicit manner" is: The first scheduling request carries first indication information, and the first indication information is used to instruct the network device to indicate the uplink transmission resource of the first carrier; and the second scheduling request carries second indication information, and the second indication information is used to instruct the network device to indicate the uplink transmission resource of the second carrier.

Alternatively, the terminal device requests the uplink transmission resource from the network device in the "implicit manner". Optionally, the sending, by the terminal device, a first scheduling request and a second scheduling request to the network device includes:

sending, by the terminal device, the first scheduling request to the network device by using the first carrier, and sending the second scheduling request to the network device by using the second carrier.

In this way, when receiving scheduling requests, the network device may respectively allocate, to the terminal device, uplink transmission resources on carriers on which the scheduling requests are located, so that the terminal device transmits BSRs.

In some possible embodiments, the method further includes:

receiving, by the terminal device, indication information sent by the network device based on the first scheduling request and the second scheduling request, where the indication information is used to indicate the uplink transmission resource of the first carrier and the uplink transmission resource of the second carrier.

In some possible embodiments, the transmitting, by the terminal device, the first MAC control element and the second MAC control element on different uplink transmission resources of a same carrier includes:

transmitting, by the terminal device, the first MAC control element and the second MAC control element in different MAC PDUs by using a same carrier.

Therefore, the terminal device transmits the first MAC control element and the second MAC control element on the different uplink transmission resources of the same carrier. In this way, it can be ensured that the original data packet and the duplicate data packet are not transmitted in a same MAC PDU, helping to improve the data transmission reliability.

In some possible embodiments, the method further includes:

receiving, by the terminal device, second information sent by a network device, where the second information is used to instruct the terminal device to transmit the first BSR and the second BSR in different MAC PDUs; and the transmitting, by the terminal device, the first MAC control element and the second MAC control element on different uplink transmission resources of a same carrier includes:

transmitting, by the terminal device based on the second information, the first BSR and the second BSR in the different MAC PDUs by using a same carrier.

Specifically, for example, a BSR corresponding to data on a logical channel is included in a MAC PDU, and then, a BSR corresponding to data on a duplicate logical channel corresponding to the logical channel cannot be transmitted by using the MAC PDU. In this way, it can be ensured that a BSR corresponding to the original data packet and a BSR corresponding to the duplicate data packet are not transmitted in a same MAC PDU, helping to improve the data transmission reliability.

Optionally, the second information includes at least one of identifier information of the logical channel and priority information of the logical channel.

Optionally, the identifier information of the logical channel may be the identifier information (such as an ID or an index index) of the logical channel. In this way, the terminal device may use the identifier information of the logical channel to identify a logical channel used to carry the original data packet or used to carry the duplicate data packet. In other words, the terminal device may use the ID or the index of the logical channel to distinguish between the logical channel for carrying the original data packet and the logical channel for carrying duplicate data packet.

Optionally, the priority information of the logical channel may indicate a priority of the logical channel. In this way, the terminal device may determine, based on priorities of logical channels, sizes of data packets transmitted on the logical channels.

According to a second aspect, a data transmission method is provided. The method includes:

determining, by a network device, first signaling, where the first signaling carries information that can enable a terminal device to simultaneously transmit a first MAC control element and the second MAC control element on different uplink transmission resources; and sending, by the network device, the first signaling to the terminal device.

In the embodiments of this application, when configuring a logical channel group, the network device may determine the first signaling, where the first signaling carries the information that can enable the terminal device to simultaneously transmit the first MAC control element and the second MAC control element on the different uplink transmission resources, and send the first signaling to the terminal device, so that the terminal device transmits the MAC control elements on the different transmission resources, helping to improve the data transmission reliability.

Optionally, the first MAC control element includes a first BSR, the second MAC control element includes a second BSR, the first BSR is triggered by first data, the second BSR is triggered by second data, and the first data and the second data are duplicate data of each other.

In some possible embodiments, the first signaling carries first information, and the first information includes a correspondence that is between a logical channel and a carrier and that is configured by the network device, where the correspondence is used by the terminal device to transmit the first BSR on an uplink transmission resource of the first carrier, and transmit the second BSR an uplink transmission resource of the second carrier.

Therefore, the network device sends the first signaling to the terminal device, the first signaling carries the first information, and the first information includes the correspondence that is between the logical channel and the carrier and that is configured by the network device, so that the terminal device may transmit, based on the correspondence, the first BSR on the uplink transmission resource of the first carrier, and transmit the second BSR the uplink transmission resource of the second carrier, helping to improve the data transmission reliability.

In some possible embodiments, the first signaling carries second information, and the second information is used to instruct the terminal device to transmit the first BSR and the second BSR in different MAC PDUs.

Therefore, the network device sends the first signaling to the terminal device, the first signaling carries the second information, so that the terminal device may transmit the first BSR and the second BSR in the different MAC PDUs based on the second information, helping to improve the data transmission reliability.

According to a third aspect, a terminal device is provided, to perform the method in any one of the first aspect or the possible embodiments of the first aspect. Specifically, the terminal device includes units configured to perform the method in any one of the first aspect or the possible embodiments of the first aspect.

According to a fourth aspect, a network device is provided, to perform the method in any one of the second aspect or the possible embodiments of the second aspect. Specifically, the network device includes units configured to perform the method in any one of the second aspect or the possible embodiments of the second aspect.

According to a fifth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in any one of the first aspect or the possible embodiments of the first aspect.

According to a sixth aspect, a network device is provided. The network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the second aspect or any possible implementation of the second aspect.

According to a seventh aspect, a computer readable storage medium is provided, the computer readable storage medium stores a program, and the program enables the terminal device to perform the data transmission method in any one of the first aspect and the embodiments of the first aspect.

According to an eighth aspect, a computer readable storage medium is provided, the computer readable storage medium stores a program, and the program enables the network device to perform the data transmission method in any one of the second aspect and the embodiments of the second aspect.

BRIEF DESCRIPTION OF DRAWINGS

FIG. 5 is a schematic flowchart of a data transmission method according to another embodiment of this application;

FIG. 6 is a schematic block diagram of a terminal device according to an embodiment of this application;

FIG. 7 is a schematic block diagram of a network device according to an embodiment of this application;

DESCRIPTION OF EMBODIMENTS

The following describes technical solutions of this application with reference to accompanying drawings.

It should be understood that, technical solutions in embodiments of this application may be applied to various communications systems, for example, current communications systems such as a global mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), and a universal mobile telecommunication system (UMTS), and in particular, applied to a future 5G new radio (NR) NR system, or a 5G system, or an architecture similar to LTE.

It should further be understood that, in the embodiments of this application, a network side device may be referred to as a network device or base station, and the like, and the base station may be a base transceiver station (BTS) in the GSM or CDMA, or may be a NodeB in the WCDMA, or may be an evolved NodeB (eNB or eNodeB) in the LTE, or a base station device gNB in a future 5G network, and this is not limited in this application.

It should further be understood that, a terminal device in the embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or terminal device in a future 5G network, and the like.

Figure 1:
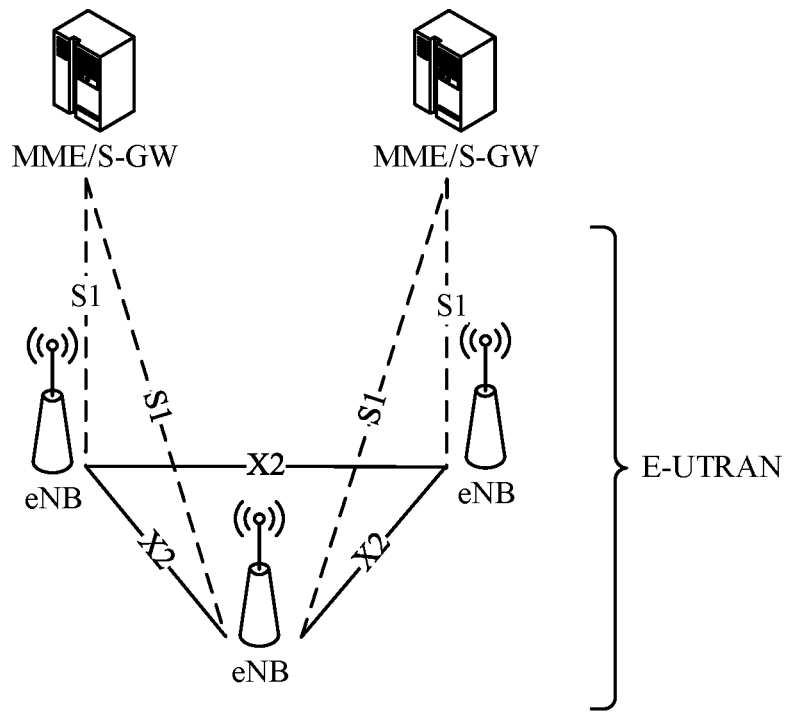
FIG. 1 is a diagram of a system architecture.

FIG. 1 is a diagram of an LTE network architecture. An LTE architecture is also referred to as an evolved UMTS terrestrial radio access network (E-UTRAN) architecture. As shown in FIG. 1, the E-UTRAN mainly includes an eNB. The eNB not only has a function of a NodeB, but also can complete most functions of a radio network controller (RNC), including a physical layer, a medium access control (MAC) layer, radio resource control (RRC), scheduling, access control, carrier control, access mobility management, inter-cell radio resource management (ICR), and the like. eNodeBs are directly interconnected in an X2 interface manner, and the eNB is connected to a packet core (EPC) through an S1 interface. Specifically, the eNB is connected to a mobility management network element (MME) through S1-MME, and is connected to a serving gateway (S-GW) through S1-U. The S1 interface supports a many-to-many connection between the MME/S-GW and the eNB, to be specific, one eNB may be connected to a plurality of MME/S-GWs, or a plurality of eNBs may alternatively be connected to a same MME/S-GW.

Figure 2:
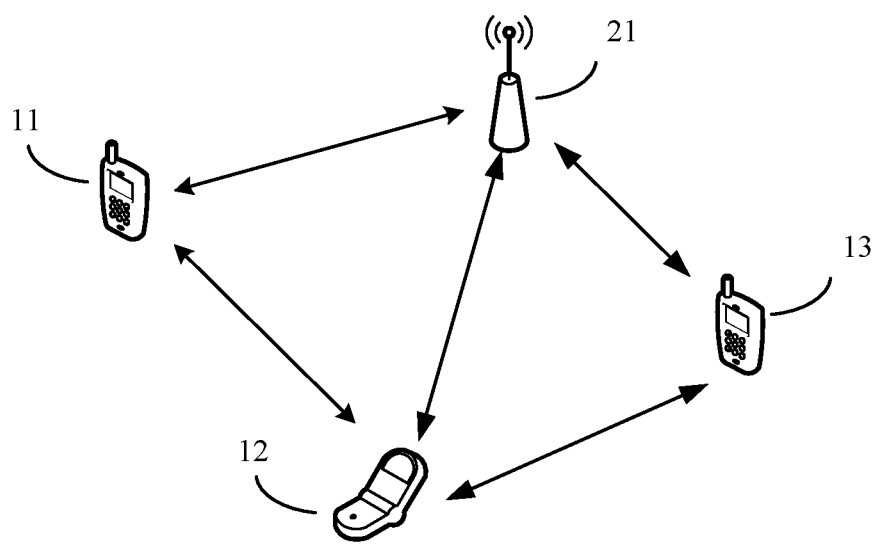
FIG. 2 is a schematic diagram of a scenario to which an embodiment of this application is applied.

FIG. 2 is a schematic diagram of a scenario to which an embodiment of this application is applied. It should be understood that, for ease of understanding, herein a scenario in FIG. 2 is introduced as an example for description, but does not constitute a limitation to this application. FIG. 2 shows a terminal device 11, a terminal device 12, a terminal device 13, and a base station 21. For example, the base station 21 is a transmit end, and the terminal device 11 is a receive end.

As shown in FIG. 2, the terminal device 11 may communicate with the base station 21, the terminal device 12 may communicate with the base station 21, and the terminal device 13 communicates with the base station 21. Alternatively, the terminal device 12 may alternatively communicate with the terminal device 11. Alternatively, as another case, the terminal device 13 communicates with the base station 12.

The following first describes related concepts and terms provided in the embodiments of this application.

In LTE, radio interfaces may be divided into three protocol layers, from the bottom to the top successively being: a physical layer (L1), a data link layer (L2), and a network layer (L3). L1 is mainly used to provide a high layer service with a wireless physical channel for transmission. From the bottom to the top, L2 successively includes three sublayers: packet data convergence protocol (PDCP), radio link layer control (RLC), and medium access control (MAC). L3 includes a radio resource control (RRC) sublayer of an access stratum, and mobility management (MM) and call control (Call Control, CC) of a non-access stratum.

In a data transmission process, each sublayer in the L2 layer may correspond to one entity. For example, the PDCP layer corresponds to one PDCP entity, responsible for managing the PDCP layer, and the RLC layer corresponds to one RLC entity, responsible for managing the RLC layer. For example, data in a radio bearer (RB) may be processed by the PDCP entity, to generate a PDCP protocol data unit (PDU), and the PDCP entity transfers the PDCP PDU to a corresponding RLC entity. The RLC entity processes the PDCP PDU to generate an RLC PDU, and transfers the RLC PDU to a MAC entity for processing. The MAC entity processes the RLC PDU to generate a MAC PDU, and transfers the MAC PDU to the L1 layer, to successfully send data in an RB.

Figure 3:
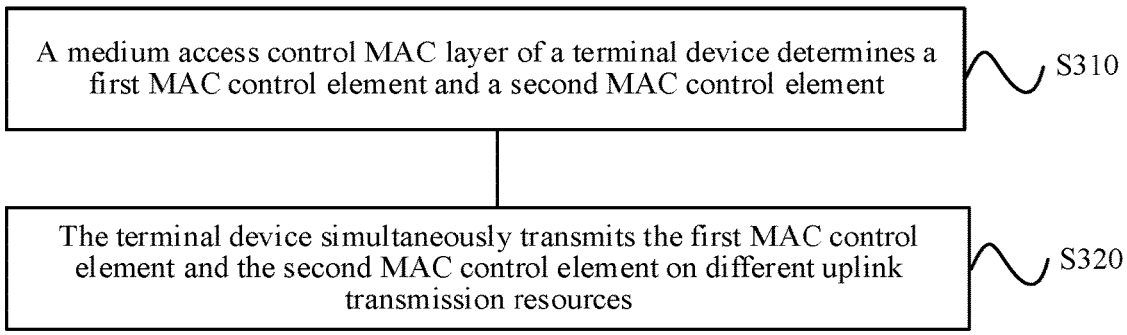
FIG. 3 is a schematic flowchart of a data transmission method according to an embodiment of this application.

FIG. 3 is a schematic flowchart of a data transmission method 300 according to an embodiment of this application. As shown in FIG. 3, the method 300 includes the following steps.

S310: A MAC layer of a terminal device determines a first MAC control element and a second MAC control element.

Specifically, the MAC layer of the terminal device generates a MAC control element (also referred to herein as a MAC CE), such as the first MAC control element.

Optionally, S310 includes:

triggering, by the MAC layer of the terminal device, the first MAC control element; and copying, by the MAC layer of the terminal device, the first MAC control element, to obtain the second MAC control element.

Optionally, the MAC layer of the terminal device may make a plurality of copies of the first MAC control element, to obtain a plurality of copies of the MAC control element.

For example, the terminal device may copy the first MAC control element, to obtain the second MAC control element. The first MAC control element and the second MAC control element may be respectively understood as an original MAC control element and a duplicate MAC control element.

S320: The terminal device simultaneously transmits the first MAC control element and the second MAC control element on different uplink transmission resources.

An uplink transmission resource may also be referred to as an uplink transmission grant (UL Grant) license.

Specifically, the terminal device may transmit the first MAC control element and the second MAC control element on the different uplink transmission resources, such as different transport blocks (TB). In this way, if one of the transport blocks is discarded, transmission on another transport block is not affected, helping to improve data transmission reliability.

In this embodiment of this application, the terminal device transmits the first MAC control element and the second MAC control element on the different uplink transmission resources, to help to improve the data transmission reliability.

Optionally, S320 includes:

transmitting, by the terminal device, the first MAC control element on an uplink transmission resource of a first carrier, and transmitting the second MAC control element on an uplink transmission resource of a second carrier, where the first carrier is different from the second carrier.

Specifically, in carrier aggregation (CA), the terminal device may use different carriers to transmit the first MAC control element and the second MAC control element.

Optionally, there are eight types of MAC control elements, respectively being a buffer status report (Buffer State Report, BSR), a cell radio network temporary identifier (C-RNTI), a discontinuous reception (DRX) command, a terminal contention resolution identifier (UE Contention Resolution Identity), a timing advance command, power headroom, multicast channel (MCH) scheduling information, and SCELL activation/deactivation.

Optionally, the first MAC control element includes a first buffer status report BSR, the second MAC control element includes a second BSR, the first BSR is triggered by first data, the second BSR is triggered by second data, and the first data and the second data are duplicate data of each other.

In other words, a BSR may be understood as a MAC CE. The BSR is used by the terminal device to indicate an amount of data that the terminal device needs to send.

Optionally, the terminal device may use different carriers to transmit the first BSR and the second BSR.

Optionally, the first BSR is triggered by first data, the second BSR is triggered by second data, and the first data and the second data are duplicate data of each other. That is, the first data is duplicate data of the second data and the second data is duplicate data of the first data. For example, if the first data is an original data packet, the second data is a duplicate data packet obtained by copying the original data packet; or if the second data is an original data packet, the first data is a duplicate data packet obtained by copying the original data packet.

Correspondingly, if the first data is an original data packet, and the second data is a duplicate data packet, the first BSR is an original BSR and the second BSR is a duplicate BSR.

Optionally, the first BSR is triggered by a logical channel group in which the first data is located, and the second BSR is triggered by a logical channel group in which the second data is located; or the first BSR is triggered by a logical channel on which the first data is located, and the second BSR is triggered by a logical channel on which the second data is located.

In this embodiment of this application, that the network device configures a retransmission function through RRC signaling specifically includes: The network device configures a retransmission function for a DRB when establishing the user data bearer (DRB). One DRB includes one PDCP entity, two RLC entities are configured under one PDCP entity, and the two RLC entities respectively process the original data packet and the duplicate data packet. One RLC entity may correspond to one logical channel. In this way, the two logical channels may be respectively used to transmit the original data packet (such as the first data) and the duplicate data packet (such as the second data).

Specifically, when configuring logical channels (LCH), the network device respectively configures, into different logical channel groups (LCG), the logical channel on which the first data is located and the logical channel on which the second data is located, in other words, the logical channel on which the first data is located and the logical channel on which the second data is located correspond to the different logical channel groups. In this way, the first BSR may be triggered by the logical channel group corresponding to the logical channel on which the first data is located, and the second BSR may be triggered by the logical channel group corresponding to the logical channel on which the second data is located.

Alternatively, the first BSR may be directly triggered by the logical channel on which the first data is located, and the second BSR may be directly triggered by the logical channel on which the second data is located. To be specific, when triggering BSRs for data packets, the terminal device may respectively trigger the BSRs on the two logical channels (namely, a logical channel on which an original data packet is transmitted and a logical channel on which a duplicate data packet is transmitted).

It should be noted that, for the two logical channels, if one logical channel is a logical channel on which an original PDU is transmitted, and the other logical channel is a logical channel on which a duplicate PDU is transmitted, when data arrives on either logical channel and a BSR needs to be triggered, this logical channel is not affected by whether data is transmitted on the other logical channel. In other words, the two logical channels may be understood as mutually independent logical channels.

Optionally, the method 300 further includes:

triggering, by the terminal device, the second BSR when there is to-be-sent data on the logical channel on which the second data is located.

Specifically, if the terminal device already sends the first BSR, in a process of waiting for the uplink transmission resource (UL grant), if there is to-be-sent data on the logical channel on which the second data is located, the terminal device may trigger the second BSR, and does not need to determine, based on a priority of the to-be-sent data, whether to trigger the second BSR. In other words, for a BSR triggering mechanism in this embodiment of this application, if the terminal device learns that there is to-be-sent data on the logical channel on which the second data is located, the terminal device may directly trigger the second BSR.

In this embodiment of this application, one MAC CE cannot include both the first BSR and the second BSR (namely, the original BSR and the duplicate BSR). In other words, the first BSR and the second BSR cannot be sent in one long BSR format. The first BSR and the second BSR may be included in different long BSR formats, or the first BSR and the second BSR are sent in different short BSR formats.

Optionally, in this embodiment of this application, when the first BSR is transmitted in a MAC PDU, the terminal device does not cancel the second BSR; or when the second MAC control element and the second BSR are transmitted in a same MAC PDU, the terminal device does not cancel the first BSR.

Specifically, if a BSR is already transmitted in a MAC PDU, the terminal device does not cancel a duplicate BSR or an original BSR corresponding to the BSR. In other words, for a BSR cancelation mechanism in this embodiment of this application, if one BSR is included in a to-be-transmitted MAC PDU, no BSR that is already triggered needs to be canceled.

Optionally, the first BSR and the second BSR are transmitted on different uplink transmission resources within a same transmission time interval.

Compared with a solution in which only one BSR can be sent within one TTI in the prior art, the first BSR and the second BSR in this embodiment of this application may be simultaneously transmitted within one TTI by using one MAC entity.

Alternatively, the first BSR and the second BSR are transmitted within different transmission time intervals (TTIs).

In this embodiment of this application, the first BSR and the second BSR are not necessarily totally the same. This is because a logical channel group may include a logical channel that is not configured with the retransmission function. For example, the first BSR includes data of another logical channel that is not configured with the retransmission function. The following provides descriptions with reference to an example in FIG. 4.

Figure 4:
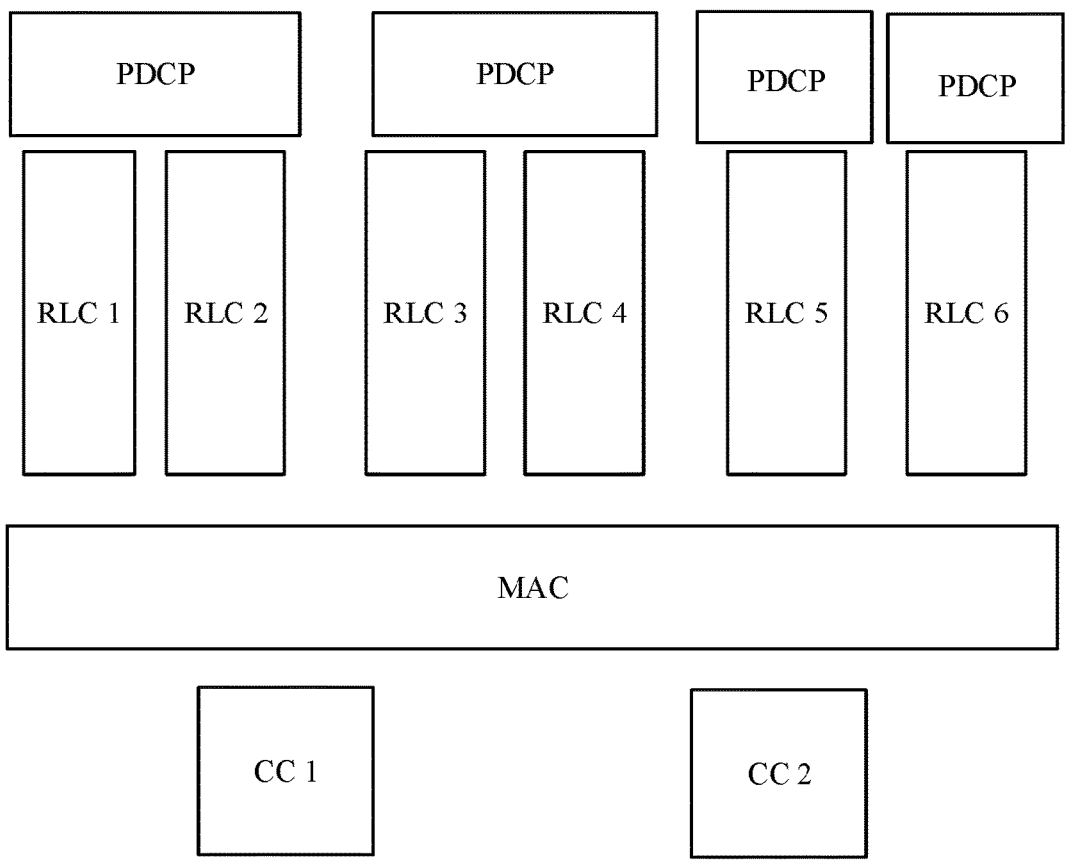
FIG. 4 is a schematic diagram of an example according to an embodiment of this application.

FIG. 4 is a schematic diagram of an example according to an embodiment of this application. As shown in FIG. 4, first PDCP and second PDCP are configured with retransmission functions, and third PDCP and fourth PDCP are not configured with retransmission functions. The first PDCP includes RLC 1 and RLC 2, the second PDCP includes RLC 3 and RLC 4, the third PDCP includes RLC 5, and the fourth PDCP includes RLC 6. The RLC 1 and the RLC 2 respectively process an original data packet and a duplicate data packet, thereby respectively triggering an original BSR and a duplicate BSR. The RLC 3 and the RLC 4 respectively process an original data packet and a duplicate data packet, thereby respectively triggering an original BSR and a duplicate BSR. A network device respectively configures the RLC 1 and the RLC 2 into different logical channel groups, and respectively configures the RLC 3 and the RLC 4 into different logical channel groups. Because the third PDCP and the fourth PDCP are not configured with the retransmission functions, data of RLC 5 may include an original BSR triggered under the first PDCP or the second PDCP, and data of RLC 6 may include a duplicate BSR triggered under the first PDCP or the second PDCP. Further, the data or the triggered BSRs of the RLC layers enter a MAC layer, and then are respectively transmitted on an uplink transmission resource of a carrier (Component Carrier, CC) 1 and an uplink transmission resource of a carrier CC 2.

It should be understood that, herein, FIG. 4 is introduced only for ease of understanding of this embodiment of this application, but does not constitute a limitation to this embodiment of this application.

Optionally, after the terminal device triggers the first BSR and the second BSR, if there is an available uplink transmission resource, the terminal device may directly separately transmit the first BSR and the second BSR on the uplink transmission resource. Alternatively, if there is no available uplink transmission resource, the terminal device needs to request an uplink transmission resource from the network device.

Optionally, the method 300 may further include:

sending, by the terminal device, a first scheduling request and a second scheduling request to the network device, where the first scheduling request is used to request the uplink transmission resource for the first BSR, and the second scheduling request is used to request the uplink transmission resource for the second BSR.

Specifically, if there is no available uplink transmission resource, the terminal device needs to trigger different scheduling requests (SR), to request the uplink transmission resources from the network device. For example, the terminal device sends the first scheduling request to the network device, to request the uplink transmission resource for the first BSR, and sends the second scheduling request to the network device, to request the uplink transmission resource for the second BSR. Herein, the terminal device may request the uplink transmission resources from the network device in an explicit manner or an implicit manner.

For example, in embodiments, the "explicit manner" is: The first scheduling request carries first indication information, and the first indication information is used to instruct the network device to indicate the uplink transmission resource of the first carrier; and the second scheduling request carries second indication information, and the second indication information is used to instruct the network device to indicate the uplink transmission resource of the second carrier.

In other words, the terminal device may separately add indication information to different scheduling requests, to indicate that uplink transmission resources used by the network device to transmit BSRs need to be allocated to different carriers. For example, the first scheduling request carries the first indication information, to instruct the network device to allocate an uplink grant of the first carrier to the first BSR; and the second scheduling request carries the second indication information, to instruct the network device to allocate an uplink grant of the second carrier to the second BSR. In this way, when receiving the first scheduling request and the second scheduling request, the network device may separately obtain the first indication information and the second indication information, to allocate, in the first carrier, the uplink grant to the first BSR based on the first indication information, and allocate, in the second carrier, the uplink grant to the first BSR based on the second indication information, so that the terminal device separately transmits, in the different carriers, the first BSR and the second BSR, helping to improve the data transmission reliability.

The following describes that the terminal device requests the uplink transmission resource from the network device in the "implicit manner". Optionally, the sending, by the terminal device, a first scheduling request and a second scheduling request to the network device includes:

sending, by the terminal device, the first scheduling request to the network device by using the first carrier, and sending the second scheduling request to the network device by using the second carrier.

Specifically, the terminal device may send scheduling requests to the network device by using different carriers. For example, the terminal device sends the first scheduling request to the network device by using the first carrier, and sends the second scheduling request to the network device by using the second carrier. In this way, when receiving scheduling requests, the network device may respectively allocate, to the terminal device, uplink transmission resources on carriers on which the scheduling requests are located, so that the terminal device transmits BSRs.

For example, when receiving, in the first carrier, the first scheduling request sent by the terminal device, the network device allocates the uplink transmission resource of the first carrier to the first BSR, so that the terminal device transmits the first BSR on the uplink transmission resource of the first carrier. In addition, when receiving, in the second carrier, the second scheduling request sent by the terminal device, the network device allocates the uplink transmission resource of the second carrier to the second BSR, so that the terminal device transmits the second BSR on the uplink transmission resource of the second carrier. In this way, it is also ensured that the terminal device transmits BSRs by using different carriers, helping to improve the data transmission reliability.

In conclusion, the terminal device may request the uplink transmission resources in the "explicit manner" or the "implicit manner".

Optionally, the method 300 may further include:

receiving, by the terminal device, indication information sent by the network device based on the first scheduling request and the second scheduling request, where the indication information is used to indicate the uplink transmission resource of the first carrier and the uplink transmission resource of the second carrier.

Specifically, the terminal device may receive the indication information sent by the network device, where the indication information is used to indicate the uplink transmission resource of the first carrier and the uplink transmission resource of the second carrier, to learn of uplink transmission resources in different carriers based on the indication information, thereby transmitting the first BSR and the second BSR on the uplink transmission resources in the different carriers.

Optionally, the method 300 may further include:

receiving, by the terminal device, first information sent by a network device, where the first information includes a correspondence that is between a logical channel and a carrier and that is configured by the network device; and the transmitting, by the terminal device, the first MAC control element on an uplink transmission resource of a first carrier, and transmitting the second MAC control element on an uplink transmission resource of a second carrier includes:

transmitting, by the terminal device based on the correspondence, the first BSR on the uplink transmission resource of the first carrier, and transmitting the second BSR on the uplink transmission resource of the second carrier.

Optionally, the first information may be carried in control signaling or high layer signaling, such as RRC signaling.

Specifically, when configuring logical channel groups, the network device may bind carrier information (for example, information such as a carrier number or a carrier identifier) to the logical channel groups, that is, determine carriers corresponding to the logical channel groups, or may determine a correspondence between each logical channel and a carrier. The network device may notify the terminal device of the correspondence between each logical channel and the carrier by using the first information, so that the terminal device learns of the carrier corresponding to each logical channel group. In this way, the terminal device may transmit, based on the correspondence between the logical channel and the carrier, the first BSR on the uplink transmission resource of the first carrier, and transmit the second BSR on the uplink transmission resource of the second carrier.

It should be understood that, in this embodiment of this application, the sequence number "first" or "second" is introduced only for distinguishing between different objects, for example, distinguishing between different "MAC control elements", or distinguishing between different "carriers", or distinguishing between different "BSRs", and does not constitute a limitation to this embodiment of this application.

Therefore, in this embodiment of this application, the terminal device transmits the first BSR and the second BSR by using the different carriers, helping to improve the data transmission reliability.

The foregoing describes a technical solution of transmitting the first MAC control element and the second MAC control element on the uplink transmission resources in the different carriers. The following describes a technical solution of transmitting the first MAC control element and the second MAC control element on different uplink transmission resources in a same carrier.

Optionally, in an embodiment, S320 may include:

transmitting, by the terminal device, the first MAC control element and the second MAC control element on different uplink transmission resources of a same carrier.

Specifically, the terminal device transmits the first MAC control element and the second MAC control element on the different uplink transmission resources of the same carrier. In this way, it can be ensured that the original data packet and the duplicate data packet are not transmitted in a same MAC PDU, helping to improve the data transmission reliability.

Optionally, the transmitting, by the terminal device, the first MAC control element and the second MAC control element on different uplink transmission resources includes:

transmitting, by the terminal device, the first MAC control element and the second MAC control element in different MAC PDUs by using a same carrier.

Specifically, when the original data packet and the duplicate data packet are transmitted in a same carrier, the terminal device may transmit the first MAC control element and the second MAC control element in the different MAC PDUs. Specifically, for example, if data on a logical channel is included in a MAC PDU, data on a duplicate logical channel corresponding to it cannot be transmitted by using the MAC PDU.

Optionally, the first data and the second data may be transmitted by using different MAC PDUs of a same carrier.

Optionally, the first MAC control element includes a first BSR, and the second MAC control element includes a second BSR. For related descriptions or concepts (for example, BSR triggering, a triggering mechanism, and a cancellation mechanism) about the first BSR and the second BSR, refer to the foregoing. For brevity, details are not described herein again.

Specifically, the terminal device may respectively transmit, by using different MAC PDUs, a BSR corresponding to the original data packet and a BSR corresponding to the duplicate data packet. Specifically, for example, a BSR corresponding to data on a logical channel is included in a MAC PDU, and then, a BSR corresponding to data on a duplicate logical channel corresponding to it cannot be transmitted by using the MAC PDU. In this way, it can be ensured that the BSR corresponding to the original data packet and the BSR corresponding to the duplicate data packet are not transmitted in a same MAC PDU, helping to improve the data transmission reliability.

Optionally, the method 300 may further include:

receiving, by the terminal device, second information sent by a network device, where the second information is used to instruct the terminal device to transmit the first BSR and the second BSR in different MAC PDUs; and the transmitting, by the terminal device, the first MAC control element and the second MAC control element on different uplink transmission resources of a same carrier includes:

transmitting, by the terminal device based on the second information, the first BSR and the second BSR in the different MAC PDUs by using a same carrier.

Similar to the first information in the foregoing, the second information may also be carried in control signaling or high layer signaling, such as RRC signaling.

Specifically, when establishing a logical channel, the network device may configure a logical channel rule, such as a logical channel priority (LCP), and send second information to the terminal device. The second information may also include the logical channel rule. When receiving the second information, the terminal device may transmit the first MAC control element and the second MAC control element on different uplink transmission resources based on the second information.

Optionally, the second information includes at least one of identifier information of the logical channel and priority information of the logical channel.

Optionally, the identifier information of the logical channel may be the identifier information (such as an ID or an index) of the logical channel. In this way, the terminal device may use the identifier information of the logical channel to identify a logical channel used to carry the original data packet or used to carry the duplicate data packet. In other words, the terminal device may use the ID or the index of the logical channel to distinguish between the logical channel for carrying the original data packet and the logical channel for carrying duplicate data packet.

Optionally, the priority information of the logical channel may indicate a priority of the logical channel. In this way, the terminal device may determine, based on priorities of logical channels, sizes of data packets transmitted on the logical channels.

Therefore, in this embodiment of this application, the terminal device transmits the original data packet and the duplicate data packet by using different MAC PDUs of a same carrier, or transmits, by using different MAC PDUs of a same carrier, the BSR corresponding to the original data packet and the BSR corresponding to the duplicate data packet, helping to improve the data transmission reliability.

The following describes a data transmission method according to an embodiment of this application from a perspective of a network device side. It should be understood that, the method on the network device side corresponds to the method on a terminal device side in the foregoing. For brevity, some duplicate terms or concepts are not described again. FIG. 5 is a schematic flowchart of a method 500 according to an embodiment of this application. As shown in FIG. 5, the method 500 includes:

determining, by a network device, first signaling, where the first signaling carries information that can enable a terminal device to simultaneously transmit a first MAC control element and the second MAC control element on different uplink transmission resources; and sending, by the network device, the first signaling to the terminal device.

In this embodiment of this application, when configuring a LCG or establishing a logical channel, the network device may determine the first signaling, where the first signaling carries the information that can enable the terminal device to simultaneously transmit the first medium access control MAC control element and the second MAC control element on the different uplink transmission resources, and send the first signaling to the terminal device, so that the terminal device transmits the MAC control elements on the different transmission resources, helping to improve data transmission reliability.

Optionally, the network device may further configure identifier information of the logical channel, such as an ID or an index of the logical channel.

Optionally, the first MAC control element includes a first BSR, the second MAC control element includes a second BSR, the first BSR is triggered by first data, the second BSR is triggered by second data, and the first data and the second data are duplicate data of each other.

Optionally, the first signaling carries first information, and the first information includes a correspondence that is between a logical channel and a carrier and that is configured by the network device, where the correspondence is used by the terminal device to transmit, based on the correspondence, the first BSR on an uplink transmission resource of the first carrier, and transmit the second BSR an uplink transmission resource of the second carrier.

Specifically, the network device adds the first information to the first signaling, and the first information includes the correspondence that is between the logical channel and the carrier and that is configured by the network device. Correspondingly, the terminal device may obtain an uplink transmission resource of a corresponding carrier based on the correspondence, to be specific, transmit the first BSR on the uplink transmission resource of the first carrier, and transmit the second BSR on the uplink transmission resource of the second carrier, helping to improve the data transmission reliability.

Optionally, the first signaling carries second information, and the second information is used to instruct the terminal device to transmit the first BSR and the second BSR in different MAC PDUs.

Specifically, the network device may further add second information to the first signaling, and the second information is used to instruct the terminal device to transmit the first BSR and the second BSR in different MAC PDUs. Correspondingly, the terminal device may transmit the first BSR and the second BSR based on the second information by using the different MAC PDUs, helping to improve the data transmission reliability.

The foregoing describes the data transmission method according to the embodiments of this application, and the following describes the terminal device and the network device according to the embodiments of this application.

FIG. 6 is a schematic block diagram of a terminal device 600 according to an embodiment of this application. As shown in FIG. 6, the terminal device 600 includes:

a determining module 610, configured to determine a first MAC control element and a second MAC control element; and a transceiver module 620, configured to simultaneously transmit the first MAC control element and the second MAC control element on different uplink transmission resources.

According to the terminal device 600 in this embodiment of this application, the first MAC control element and the second MAC control element are determined, and then the first MAC control element and the second MAC control element are simultaneously transmitted on the different uplink transmission resources, to help to improve data transmission reliability.

Optionally, in an embodiment, the transceiver module 620 is specifically configured to:

transmit the first MAC control element on an uplink transmission resource of a first carrier, and transmit the second MAC control element on an uplink transmission resource of a second carrier, where the first carrier is different from the second carrier.

Optionally, in an embodiment, the transceiver module 620 is specifically configured to:

transmit the first MAC control element and the second MAC control element on different uplink transmission resources of a same carrier.

Optionally, the determining module 610 is specifically configured to:

trigger the first MAC control element; and copy the first MAC control element, to obtain the second MAC control element.

Optionally, the first MAC control element includes a first buffer status report BSR, the second MAC control element includes a second BSR, the first BSR is triggered by first data, the second BSR is triggered by second data, and the first data and the second data are duplicate data of each other.

Optionally, the first BSR is triggered by a logical channel group in which the first data is located, and the second BSR is triggered by a logical channel group in which the second data is located; or the first BSR is triggered by a logical channel on which the first data is located, and the second BSR is triggered by a logical channel on which the second data is located.

According to the terminal device 600 in this embodiment of this application, the first BSR and the second BSR are transmitted on the different uplink transmission resources, to help to improve the data transmission reliability.

Optionally, the terminal device 600 further includes:

a processing module, configured to trigger the second BSR when there is to-be-sent data on the logical channel on which the second data is located.

Optionally, when the first BSR is transmitted in a MAC PDU, the terminal device does not cancel the second BSR.

Optionally, the first BSR and the second BSR are transmitted on different uplink transmission resources within a same transmission time interval.

Optionally, in an embodiment, the transceiver module 620 is further configured to:

receive first information sent by a network device, where the first information includes a correspondence that is between a logical channel and a carrier and that is configured by the network device; and the transceiver module 620 is specifically configured to:

transmit, based on the correspondence, the first BSR on the uplink transmission resource of the first carrier, and transmit the second BSR on the uplink transmission resource of the second carrier.

Optionally, the transceiver unit 620 is further configured to:

send a first scheduling request and a second scheduling request to the network device, where the first scheduling request is used to request the uplink transmission resource for the first BSR, and the second scheduling request is used to request the uplink transmission resource for the second BSR.

Optionally, the transceiver unit 620 is further configured to:

receive indication information sent by the network device based on the first scheduling request and the second scheduling request, where the indication information is used to indicate the uplink transmission resource of the first carrier and the uplink transmission resource of the second carrier.

Optionally, in an embodiment, the transceiver module 620 is specifically configured to:

transmit the first MAC control element and the second MAC control element in different MAC PDUs by using a same carrier.

Optionally, the transceiver unit 620 is further configured to:

receive second information sent by a network device, where the second information is used to instruct the terminal device to transmit the first BSR and the second BSR in different MAC PDUs; and the transceiver module 620 is specifically configured to:

transmit, based on the second information, the first BSR and the second BSR in the different MAC PDUs by using a same carrier.

The terminal device 600 according to this embodiment of this application may correspond to an execution body of the method 300 according to the embodiments of this application, and the foregoing and other operations and/or functions of the modules in the terminal device 600 are respectively for implementing corresponding procedures of the foregoing methods. For brevity, details are not described herein again.

Therefore, according to the terminal device 600 in this embodiment of this application, the first MAC control element and the second MAC control element are determined, and then the first MAC control element and the second MAC control element are transmitted on the different uplink transmission resources, to help to improve the data transmission reliability.

FIG. 7 is a schematic block diagram of a network device 700 according to an embodiment of this application. As shown in FIG. 7, the network device 700 includes:

a determining module 710, configured to determine first signaling, where the first signaling carries information that can enable a terminal device to simultaneously transmit a first MAC control element and the second MAC control element on different uplink transmission resources; and a transceiver module 720, configured to send the first signaling to the terminal device.

Optionally, the first MAC control element includes a first buffer status report BSR, the second MAC control element includes a second BSR, the first BSR is triggered by first data, the second BSR is triggered by second data, and the first data and the second data are duplicate data of each other.

Optionally, the first signaling carries first information, and the first information includes a correspondence that is between a logical channel and a carrier and that is configured by the network device, where the correspondence is used by the terminal device to transmit the first BSR on an uplink transmission resource of the first carrier, and transmit the second BSR an uplink transmission resource of the second carrier.

Optionally, the first signaling carries second information, and the second information is used to instruct the terminal device to transmit the first BSR and the second BSR in different MAC PDUs.

The network device 700 according to this embodiment of this application may correspond to an execution body of the method 500 according to the embodiments of this application, and the foregoing and other operations and/or functions of the modules in the network device 700 are respectively for implementing corresponding procedures of the foregoing methods. For brevity, details are not described herein again.

Therefore, according to the network device 700 in this embodiment of this application, the first signaling is sent to the terminal device, so that the terminal device simultaneously transmits the first BSR and the second BSR on the different uplink transmission resources, helping to improve data transmission reliability.

Figure 8:
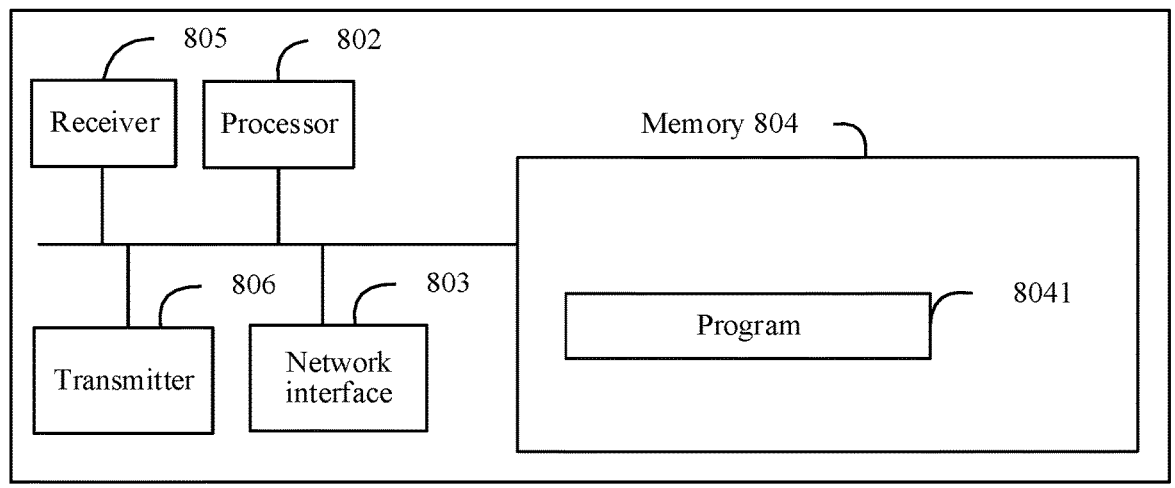
FIG. 8 is a schematic block diagram of a terminal device according to an embodiment of this application.

FIG. 8 shows a structure of a terminal device according to an embodiment of this application. The structure includes at least one processor 802 (such as a CPU), at least one network interface 803 or another communications interface, and a memory 804. Optionally, the structure may further include a receiver 805 and a transmitter 806. The processor 802 is configured to execute an executable module, such as a computer program, stored in the memory 804. The memory 804 may include a high speed random access memory (RAM), or may further include a non-volatile memory, such as at least one magnetic disk memory. A communication connection to at least one another network element is implemented by using the at least one network interface 803 (which may be wired or wireless). The receiver 805 and the transmitter 806 are configured to transmit various signals or information.

In some embodiments, the memory 804 stores a program 8041, and the program 8041 may be executed by the processor 802, to perform the method on the terminal device side in the foregoing embodiment of this application.

It should be understood that, in this embodiment of this application, the terminal device may perform some or all steps in the foregoing embodiment. These steps or operations are only an example. In this embodiment of this application, another operation or variants of various operations may be further performed. In addition, the steps may be performed in an order different from that presented in the foregoing embodiments, and the operations in the foregoing embodiments may not need to be all performed.

Figure 9:
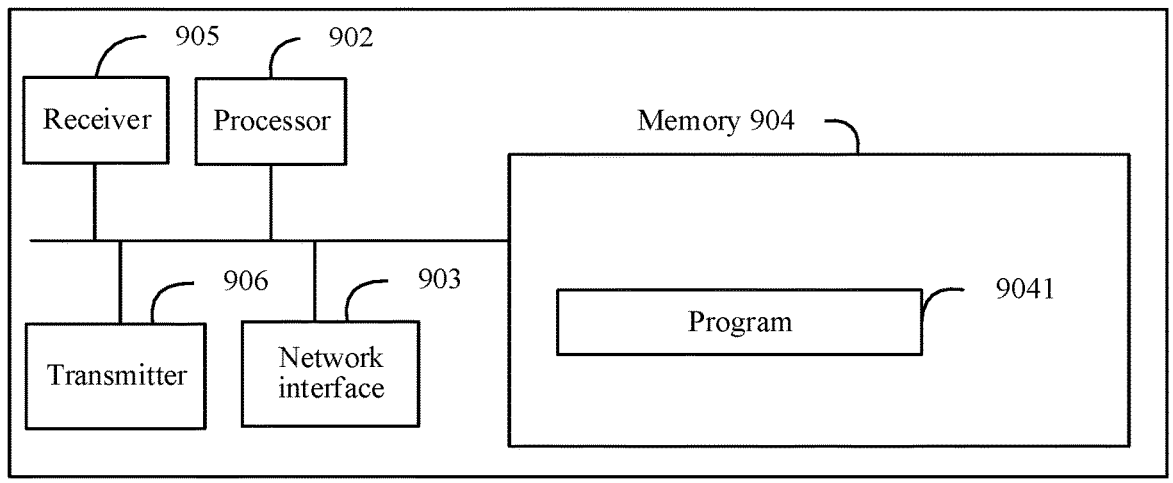
FIG. 9 is a schematic block diagram of a network device according to an embodiment of this application.

FIG. 9 shows a structure of a network device according to an embodiment of this application. The structure includes at least one processor 902 (such as a CPU), at least one network interface 903 or another communications interface, and a memory 904. Optionally, the structure may further include a receiver 905 and a transmitter 906. The processor 902 is configured to execute an executable module, such as a computer program, stored in the memory 904. The memory 904 may include a high speed RAM, or may further include a non-volatile memory, such as at least one magnetic disk memory. A communication connection to at least one another network element is implemented by using the at least one network interface 903 (which may be wired or wireless). The receiver 905 and the transmitter 906 are configured to transmit various signals or information.

In some embodiments, the memory 904 stores a program 9041, and the program 9041 may be executed by the processor 902, to perform the method on the network device side in another embodiment of this application.

It should be understood that, in this embodiment of this application, the network device may perform some or all steps in the foregoing embodiment. These steps or operations are only an example. In this embodiment of this application, another operation or variants of various operations may be further performed. In addition, the steps may be performed in an order different from that presented in the foregoing embodiments, and the operations in the foregoing embodiments may not need to be all performed.

Figure 10:
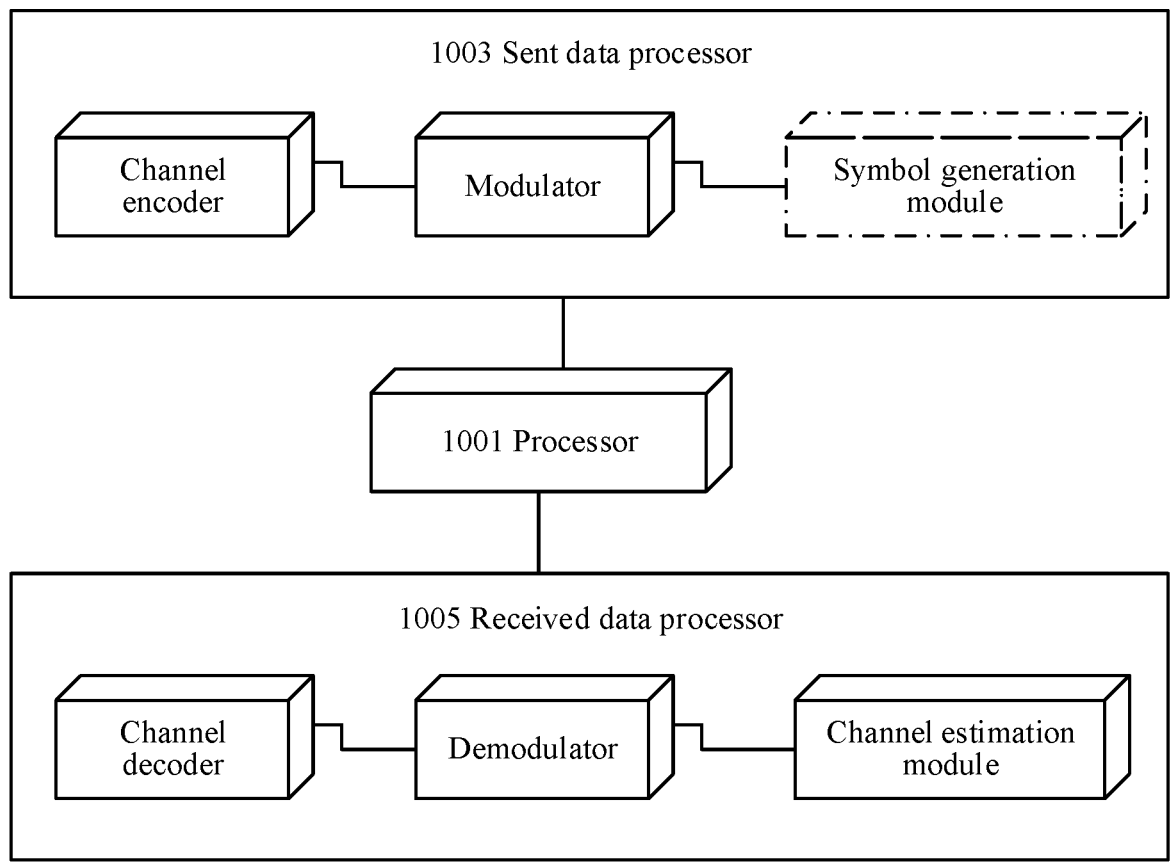
FIG. 10 is a schematic structural diagram of a terminal device according to an embodiment of this application.

For the terminal device in this embodiment of this application, refer to the device shown in FIG. 10. In an example, the device may complete a function similar to that of the processor in FIG. 8. It should be understood that, the device shown in FIG. 10 may perform the method on the terminal device side in the embodiments of this application, and can achieve a corresponding effect. For brevity, details are not described herein again. In FIG. 10, the device includes a processor, a sent data processor, and a received data processor. In FIG. 10, the determining module may be the processor 1001, and complete a corresponding function, the transceiver module in the foregoing terminal device may include a receiving module and a sending module. The receiving module may be the received data processor 1005 in FIG. 10, and the sending module may be the sent data processor 1003 in FIG. 10. Although a channel encoder, a channel decoder, a symbol generation module, and a channel estimation module are shown in the figure, it may be understood that, these modules do not constitute a limitation to this embodiment of this application, and are only an example.

Figure 11:
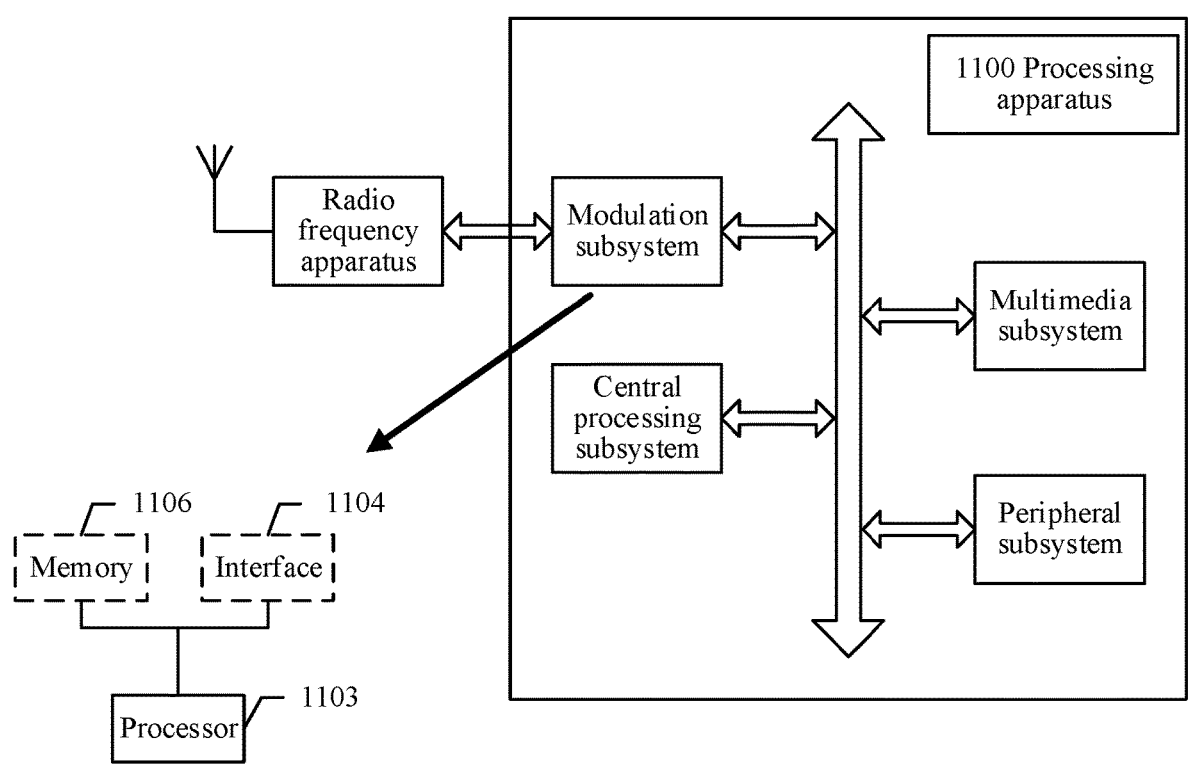
FIG. 11 is another schematic structural diagram of a terminal device according to an embodiment of this application.

FIG. 11 shows another form of a terminal device according to this embodiment. A processing apparatus 1100 includes modules such as a modulation subsystem, a central processing subsystem, and a peripheral subsystem. A communications device in this embodiment may be used as the modulation subsystem therein. Specifically, the modulation subsystem may include a processor 1103 and an interface 1104. The processor 1103 completes functions of the foregoing processing unit, and the interface 1104 completes functions of the foregoing sending unit and/or receiving unit. As another variant, the modulation subsystem includes a memory 1106, the processor 1103, and a program that is stored in the memory and that can be run on the processor, and the processor executes the program to implement the method on the terminal device side in the foregoing embodiment. It should be noted that, the memory 1106 may be non-volatile, or may be volatile, and may be located inside the modulation subsystem, or may be located in the processing apparatus 1100, provided that the memory 1106 can be connected to the processor 1103.

Figure 12:
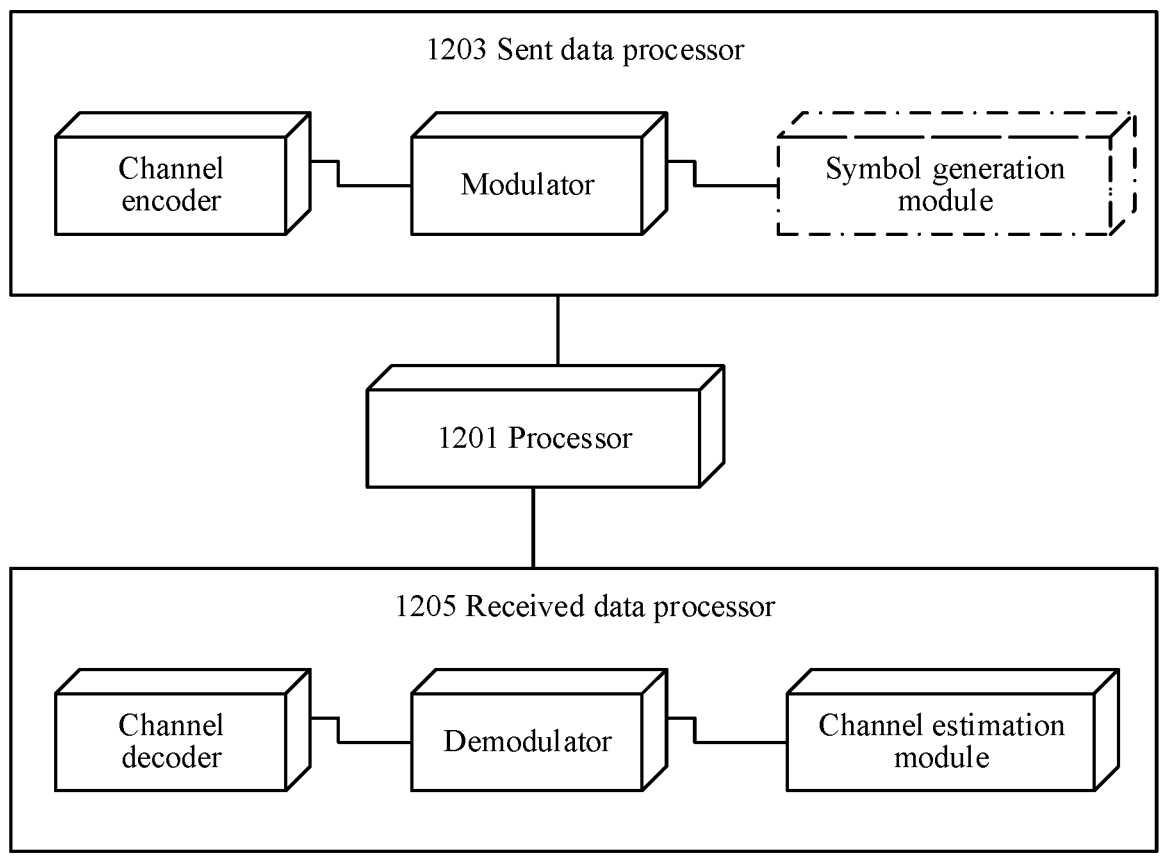
FIG. 12 is a schematic structural diagram of a network device according to an embodiment of this application.

For the network device in this embodiment of this application, refer to the device shown in FIG. 12. In an example, the device may complete a function similar to that of the processor in FIG. 9. It should be understood that, the device shown in FIG. 12 may perform the method on the network device side in the embodiments of this application, and can achieve a corresponding effect. For brevity, details are not described herein again. In FIG. 12, the device includes a processor, a sent data processor, and a received data processor. In FIG. 12, the determining module may be the processor 1201, and complete a corresponding function, the transceiver module in the foregoing network device may include a receiving module and a sending module. The receiving module may be the received data processor 1205 in FIG. 12, and the sending module may be the sent data processor 1203 in FIG. 12. Although a channel encoder, a channel decoder, a symbol generation module, and a channel estimation module are shown in the figure, it may be understood that, these modules do not constitute a limitation to this embodiment of this application, and are only an example.

Figure 13:
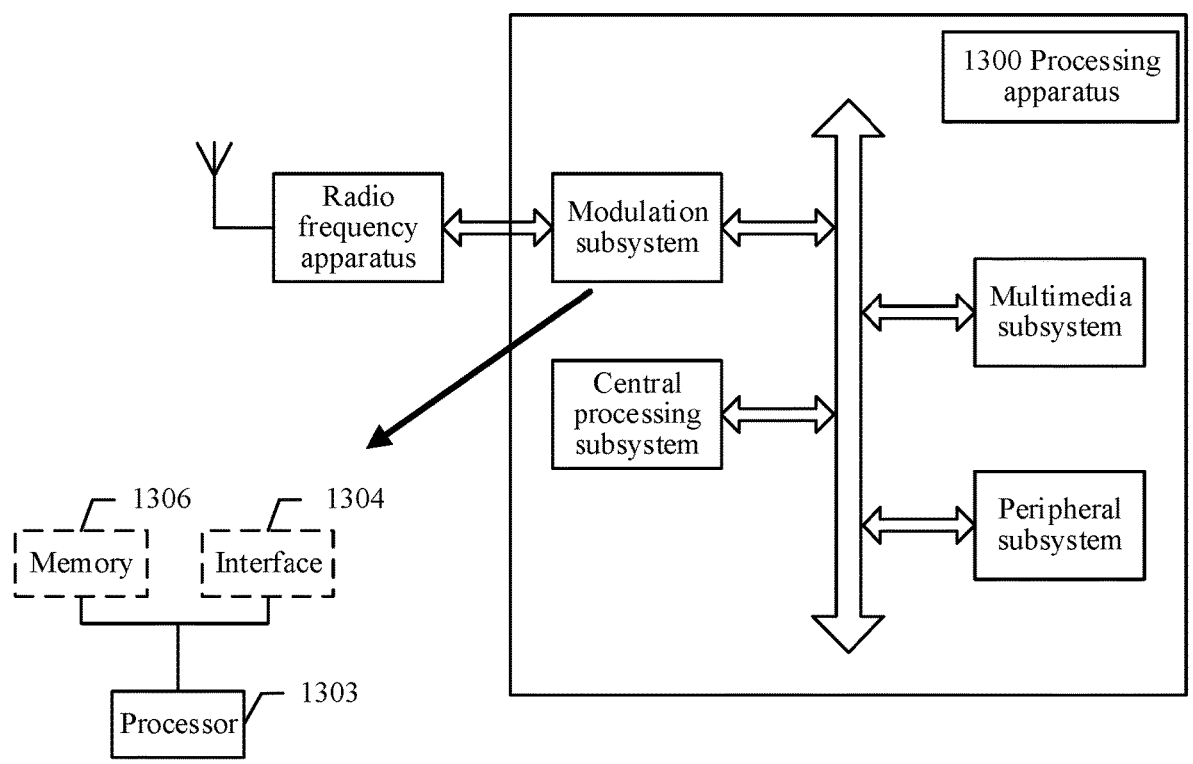
FIG. 13 is another schematic structural diagram of a network device according to an embodiment of this application.

FIG. 13 shows another form of a network device according to this embodiment. A processing apparatus 1300 includes modules such as a modulation subsystem, a central processing subsystem, and a peripheral subsystem. A communications device in this embodiment may be used as the modulation subsystem therein. Specifically, the modulation subsystem may include a processor 1303 and an interface 1304. The processor 1303 completes functions of the foregoing processing unit, and the interface 1304 completes functions of the foregoing sending unit and/or receiving unit. As another variant, the modulation subsystem includes a memory 1306, the processor 1303, and a program that is stored in the memory and that can be run on the processor, and the processor executes the program to implement the method on the network device side in the foregoing embodiment. It should be noted that, the memory 1306 may be non-volatile, or may be volatile, and may be located inside the modulation subsystem, or may be located in the processing apparatus 1300, provided that the memory 1306 can be connected to the processor 1303.

The processor in the embodiments may be a general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and a processor reads instructions in the memory and completes the steps in the foregoing methods in combination with hardware of the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a universal serial bus (USB) flash drive, a removable hard disk, a ROM, a RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A data transmission method, comprising:
receiving, by a terminal device, first signaling from a network device
determining, by a medium access control (MAC) layer of the terminal device, a first MAC control element and a second MAC control element; and
simultaneously transmitting, by the terminal device, the first MAC control element and the second MAC control element on different uplink transmission resources, to the network device;
wherein the second MAC control element is a duplicate of the first MAC control element, the uplink transmission resources are determined using the first signaling, and the terminal device uses the first signaling to simultaneously transmit the first MAC control element and the second MAC control element on the different uplink transmission resources.

2. The method according to claim 1, wherein the transmitting, by the terminal device, the first MAC control element and the second MAC control element on different uplink transmission resources comprises:
  transmitting, by the terminal device, the first MAC control element on an uplink transmission resource of a first carrier, and transmitting the second MAC control element on an uplink transmission resource of a second carrier, wherein the first carrier is different from the second carrier.

3. The method according to claim 1, wherein the transmitting, by the terminal device, the first MAC control element and the second MAC control element on different uplink transmission resources comprises:
  transmitting, by the terminal device, the first MAC control element and the second MAC control element on different uplink transmission resources of a same carrier.

4. The method according to claim 3, wherein the transmitting, by the terminal device, the first MAC control element and the second MAC control element on different uplink transmission resources of the same carrier comprises:
  transmitting, by the terminal device, the first MAC control element and the second MAC control element in different MAC protocol data units (PDUs) using the same carrier.

5. The method according to claim 4, wherein the method further comprises:
  receiving, by the terminal device, second information sent by a network device, wherein the second information is used to instruct the terminal device to transmit a first buffer status report (BSR) and a second BSR in different MAC PDUs; and
  the transmitting, by the terminal device, the first MAC control element and the second MAC control element on different uplink transmission resources of the same carrier comprises:
  transmitting, by the terminal device based on the second information, the first BSR and the second BSR in the different MAC PDUs by using the same carrier.

6. The method according to claim 1, wherein the determining, by the MAC layer of the terminal device, the first MAC control element and the second MAC control element comprises:
  triggering, by the MAC layer of the terminal device, the first MAC control element; and
  copying, by the MAC layer of the terminal device, the first MAC control element, to obtain the second MAC control element.

7. The method according to claim 1, wherein the first MAC control element comprises a first buffer status report (BSR), the second MAC control element comprises a second BSR, the first BSR is triggered by first data, and the second BSR is triggered by second data.

8. The method according to claim 7, wherein the first BSR is triggered by a logical channel group in which the first data is located, and the second BSR is triggered by a logical channel group in which the second data is located; or
  the first BSR is triggered by a logical channel on which the first data is located, and the second BSR is triggered by a logical channel on which the second data is located.

9. The method according to claim 8, wherein the method further comprises:
  triggering, by the terminal device, the second BSR when there is to-be-sent data on the logical channel on which the second data is located.

10. The method according to claim 7, wherein when the first BSR is transmitted in a MAC protocol data unit (PDU), the terminal device does not cancel the second BSR.

11. The method according to claim 7, wherein the first BSR and the second BSR are transmitted on different uplink transmission resources within a same transmission time interval.

12. The method according to claim 7, wherein the method further comprises:
  receiving, by the terminal device, first information sent by a network device, wherein the first information comprises a correspondence that is between a logical channel and a carrier and that is configured by the network device; and
  the transmitting, by the terminal device, the first MAC control element on an uplink transmission resource of a first carrier, and transmitting the second MAC control element on an uplink transmission resource of a second carrier comprises:
  transmitting, by the terminal device based on the correspondence, the first BSR on the uplink transmission resource of the first carrier, and transmitting the second BSR on the uplink transmission resource of the second carrier.

13. The method according to claim 7, wherein the method further comprises:
  sending, by the terminal device, a first scheduling request and a second scheduling request to the network device, wherein the first scheduling request requests the uplink transmission resource for the first BSR, and the second scheduling request requests the uplink transmission resource for the second BSR.

14. The method according to claim 13, wherein the method further comprises:
  receiving, by the terminal device, indication information sent by the network device based on the first scheduling request and the second scheduling request, wherein the indication information indicates the uplink transmission resource of a first carrier and the uplink transmission resource of a second carrier.

15. A terminal device, comprising:
  a transceiver configured to receive first signaling from a network device
  a processor, coupled with the transceiver, configured to determine a first medium access control (MAC) control element and a second MAC control element; and
  the transceiver further configured to simultaneously transmit the first MAC control element and the second MAC control element on different uplink transmission resources, to the network device;
  wherein the second MAC control element is a duplicate of the first MAC control element, the uplink transmission resources are determined using the first signaling, and the terminal device uses the first signaling to simultaneously transmit the first MAC control element and the second MAC control element on different uplink transmission resources.

16. The terminal device according to claim 15, wherein the transceiver is configured to:
  transmit the first MAC control element on an uplink transmission resource of a first carrier, and transmit the second MAC control element on an uplink transmission resource of a second carrier, wherein the first carrier is different from the second carrier.

17. The terminal device according to claim 15, wherein the transceiver is configured to:

transmit the first MAC control element and the second MAC control element on different uplink transmission resources of a same carrier.

18. The terminal device according to claim 15, wherein the processor is configured to:
  trigger the first MAC control element; and
  copy the first MAC control element, to obtain the second MAC control element.

19. The terminal device according to claim 15, wherein the first MAC control element comprises a first buffer status report (BSR), the second MAC control element comprises a second BSR, the first BSR is triggered by first data, and the second BSR is triggered by second data.

20. The terminal device according to claim 19, wherein the first BSR is triggered by a logical channel group in which the first data is located, and the second BSR is triggered by a logical channel group in which the second data is located; or
  the first BSR is triggered by a logical channel on which the first data is located, and the second BSR is triggered by a logical channel on which the second data is located.

* * * * *